United States Patent
Adachi (10) Patent No.: US 10,620,089 B2
(45) Date of Patent: Apr. 14, 2020

(54) BELT REPLACEMENT DETERMINATION DEVICE AND REPLACEMENT DETERMINATION METHOD

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/150,442

(22) Filed: Oct. 3, 2018

(65) Prior Publication Data

US 2019/0128777 A1 May 2, 2019

(30) Foreign Application Priority Data

Nov. 2, 2017 (JP) ................................. 2017-212829

(51) Int. Cl.
*G01M 13/023* (2019.01)
*F16H 7/02* (2006.01)
(Continued)

(52) U.S. Cl.
CPC ............ *G01M 13/023* (2013.01); *F16H 7/02* (2013.01); *F16H 57/01* (2013.01); *G01L 5/10* (2013.01);
(Continued)

(58) Field of Classification Search
CPC ..... G01M 13/023; G01M 13/025; G01L 5/10; F16H 57/01; F16H 7/02; F16H 2057/014
See application file for complete search history.

(56) References Cited

U.S. PATENT DOCUMENTS

| | | | |
|---|---|---|---|
| 7,311,012 B2* | 12/2007 | Yoshida | G05D 3/12 198/502.1 |
| 7,372,219 B2* | 5/2008 | Fujimaki | B04B 9/10 210/85 |

(Continued)

FOREIGN PATENT DOCUMENTS

| | | |
|---|---|---|
| CN | 203682509 U | 7/2014 |
| CN | 104326244 A | 2/2015 |

(Continued)

OTHER PUBLICATIONS

Japanese Decision to Grant a Patent dated Aug. 20, 2019, in connection with corresponding JP Application No. 2017-212829 (8 pgs., including English translation).

(Continued)

*Primary Examiner* — Jonathan M Dunlap
(74) *Attorney, Agent, or Firm* — Maier & Maier, PLLC (57) ABSTRACT

A belt replacement determination device includes a drive control section configured to drive, based on an evaluation operation set in advance, two or more motors out of a plurality of motors which drive joint shafts of a robot, the two or more motors including the motor which drives at least one of the joint shafts through pulleys and belts; a detection section configured to detect motor torques of the two or more motors which vary according to the evaluation operation; a torque difference calculation section configured to calculate a difference between the motor torques detected of the two or more motors; a difference variation amount calculation section configured to calculate a variation amount between two differences detected at two points of time; and a determination section configured to determine replacement of the belt upon an absolute value of the variation amount calculated exceeding a predetermined threshold.

6 Claims, 9 Drawing Sheets

(51) Int. Cl.
  *F16H 57/01* (2012.01)
  *G01L 5/10* (2020.01)
  *G01M 13/025* (2019.01)

(52) U.S. Cl.
  CPC ..... *G01M 13/025* (2013.01); *F16H 2057/014* (2013.01)

(56) References Cited

U.S. PATENT DOCUMENTS

| | | | |
|---|---|---|---|
| 8,707,805 B2* | 4/2014 | Maki | G06F 17/00 |
| | | | 73/862.381 |
| 8,884,775 B2* | 11/2014 | Komamura | B29C 45/76 |
| | | | 340/679 |
| 9,205,560 B1 | 12/2015 | Edsinger et al. | |
| 9,228,909 B1 | 1/2016 | Rembisz et al. | |
| 9,278,455 B2* | 3/2016 | Mushikami | B25J 17/0283 |
| 2005/0206339 A1 | 9/2005 | Yoshida et al. | |
| 2007/0075667 A1 | 4/2007 | Fujimaki et al. | |
| 2012/0027882 A1 | 2/2012 | Komamura et al. | |
| 2013/0166064 A1* | 6/2013 | Maki | G06F 17/00 |
| | | | 700/230 |
| 2015/0059511 A1 | 3/2015 | Mushikami et al. | |

FOREIGN PATENT DOCUMENTS

| | | | |
|---|---|---|---|
| CN | 105479484 | A | 4/2016 |
| CN | 107101823 | A | 8/2017 |
| JP | H04-97689 | U | 8/1992 |
| JP | H11-190405 | A | 7/1999 |
| JP | 2004-286474 | A | 10/2004 |
| JP | 2005-233384 | A | 9/2005 |
| JP | 2005-245113 | A | 9/2005 |
| JP | 2007-098260 | A | 4/2007 |
| JP | 2008-002664 | A | 1/2008 |
| JP | 2008-304204 | A | 12/2008 |
| JP | 2012-025091 | A | 2/2012 |
| JP | 2015-093360 | A | 5/2015 |
| WO | 2013-157143 | A1 | 10/2013 |
| WO | 2014/128849 | A1 | 8/2014 |

OTHER PUBLICATIONS

Japanese Search Report dated Aug. 13, 2019, in connection with corresponding JP Application No. 2017-212829 (28 pgs., including English translation).

Office Action dated Dec. 11, 2019, in corresponding Chinese Application No. 201811275180.9; 10 pages.

* cited by examiner

BELT REPLACEMENT DETERMINATION DEVICE AND REPLACEMENT DETERMINATION METHOD

CROSS-REFERENCE TO RELATED APPLICATIONS

This application claims the benefit of Japanese Patent Application No. 2017-212829, the content of which is incorporated herein by reference.

FIELD

The present invention relates to a belt replacement determination device and a replacement determination method.

BACKGROUND

As a drive mechanism for joint shafts of a robot, a mechanism may be used which transmits a driving force of a motor to the joint shafts through pulleys and belts. There is known a technique for diagnosing various abnormalities (slippage between the pulley and the belt, for example) which occur in such a mechanism (PCT International Publication No. WO 2014/128849 Pamphlet, for example).

SUMMARY

One aspect of the present invention provides a belt replacement determination device which includes: a drive control section configured to drive, based on an evaluation operation set in advance, two or more motors out of a plurality of motors which drive joint shafts of a robot, the two or more motors including the motor which drives at least one of the joint shafts through pulleys and belts; a detection section configured to detect motor torques of the two or more motors which vary according to the evaluation operation; a torque difference calculation section configured to calculate a difference between the motor torques detected of the two or more motors; a difference variation amount calculation section configured to calculate a variation amount between two differences detected at two points of time; and a determination section configured to determine replacement of the belt upon an absolute value of the variation amount calculated exceeding a predetermined threshold.

Another aspect of the present invention provides a belt replacement determination method which includes: a first torque detection step of detecting, at a first point of time, motor torques of two or more motors out of a plurality of motors which drive joint shafts of a robot, which vary according to an evaluation operation set in advance, by driving, based on the evaluation operation, the two or more motors, the two or more motors including the motor which drives at least one of the joint shafts through pulleys and belts; a first difference calculation step of calculating a difference between the motor torques of the two or more motors, the motor torques being detected in the first torque detection step; a second torque detection step of detecting, at a second point of time, motor torques of the two or more motors by driving the two or more motors based on the evaluation operation; a second difference calculation step of calculating a difference between the motor torques of the two or more motors, the motor torques being detected in the second torque detection step; a difference variation amount calculation step of calculating a variation amount from the difference calculated in the first difference calculation step to the difference calculated in the second difference calculation step; and a determination step of determining replacement of the belt upon an absolute value of the variation amount calculated exceeding a predetermined threshold.

DETAILED DESCRIPTION

Figure 1:
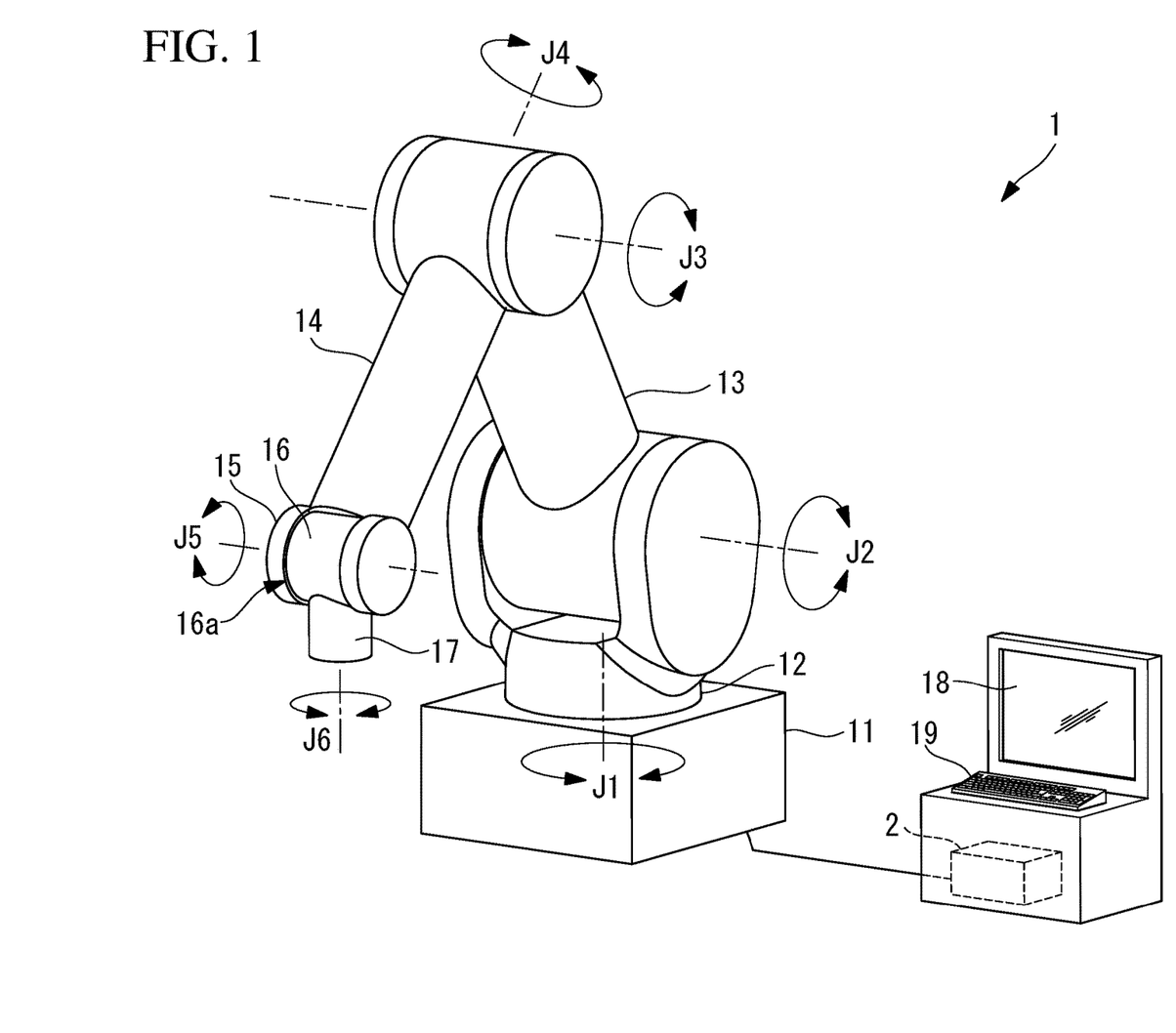
FIG. 1 is a schematic perspective view of a robot provided with a control device according to this embodiment.

A belt control device (belt replacement determination device) 2 which is used in a robot according to an embodiment of the present invention is described hereinafter with reference to drawings.
FIG. 1 is a schematic perspective view of a robot 1 provided with the control device 2 according to this embodiment. The robot 1 of this embodiment is a robot 1 such as a vertical articulated robot having six axes J1 to J6. The robot 1 includes: a base 11; a swinging body 12; a first arm 13; a second arm 14; a first wrist element 15; a second wrist element 16; a third wrist element 17; the control device 2; a manipulation section 19; and a monitor 18. The base 11 is fixed to a floor surface. The swinging body 12 is supported on the base 11 in a rotatable manner about the vertical first axis J1. The first arm 13 is supported on the swinging body 12 in a rotatable manner about a horizontal second axis J2. The second arm 14 is supported on the first arm 13 in a rotatable manner about the horizontal third axis J3. The first wrist element 15 is supported on the second arm 14 in a rotatable manner about the fourth axis J4 which extends in a longitudinal axis direction of the second arm 14. The second wrist element 16 is supported on the first wrist element 15 in a rotatable manner about the fifth axis J5 orthogonal to the fourth axis J4. The third wrist element 17 is supported on the second wrist element 16 in a rotatable manner about the sixth axis J6 orthogonal to the fifth axis J5. The control device 2 controls rotational drive about the six axes J1 to J6. The manipulation section 19 receives manipulation of a user. The monitor 18 performs various displays.

A motor not shown in the drawing and an encoder not shown in the drawing are provided for each of the six axes J1 to J6. Each motor performs rotational drive, and each encoder detects a rotation angle of the motor. The first wrist element 15 incorporates motors and the like for performing rotational driving about the fifth axis J5 and the sixth axis J6.

Figure 2:
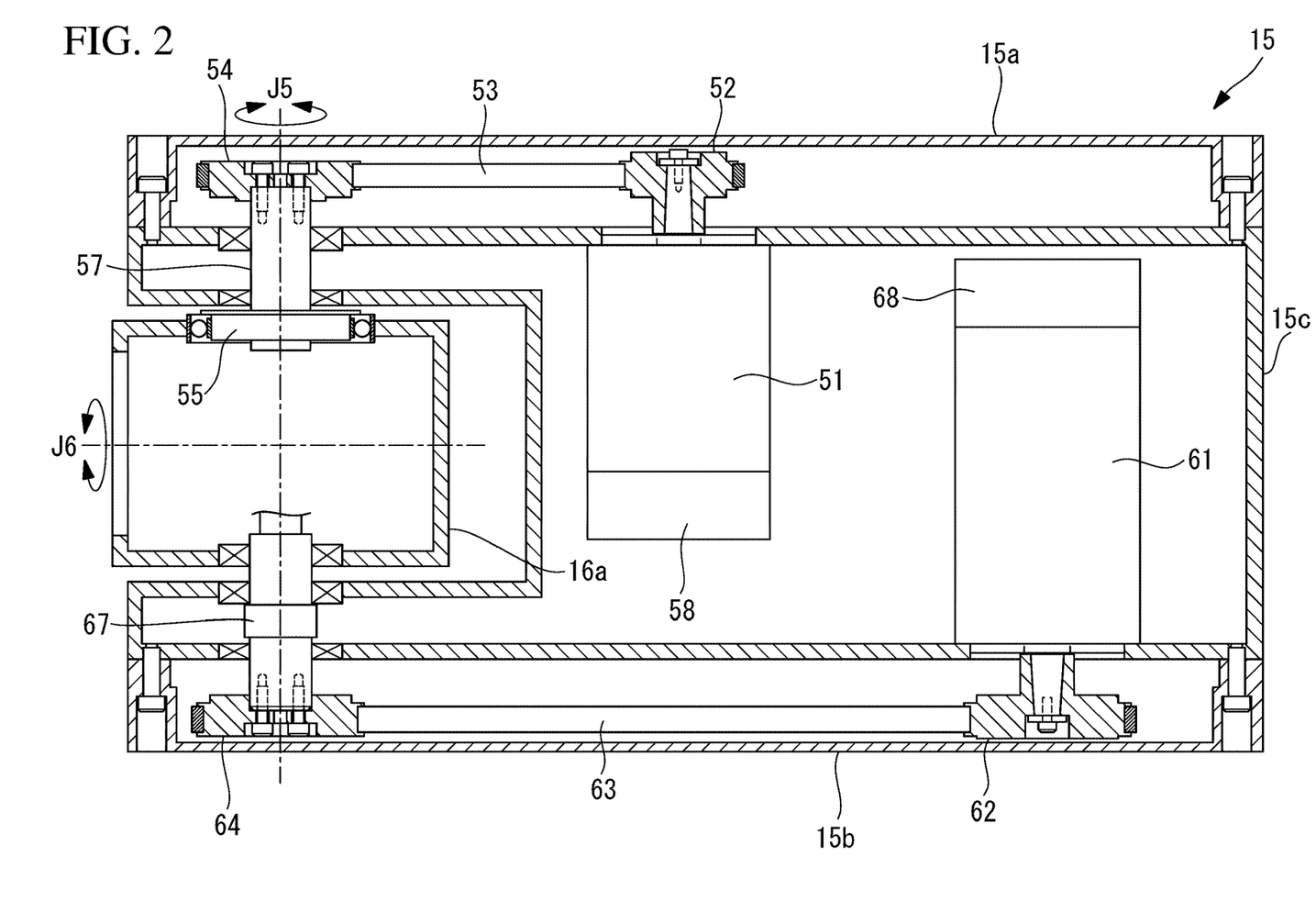
FIG. 2 is a cross-sectional view of a first wrist element and a housing.

FIG. 2 is a cross-sectional view of the first wrist element 15 and a housing 16*a* having the center along the fifth axis J5. As shown in FIG. 2, the first wrist element 15 includes: a body portion 15*c* which incorporates a J5 axis motor 51 and the like; and covers 15*a*, 15*b* disposed on both sides of the first wrist element 15 to seal the inside of the body portion 15*c*. The covers 15*a*, 15*b* are fixed to the body portion 15*c* by fastening bolts to bolt holes formed in the body portion 15*c* from the outside of the covers 15*a*, 15*b*.

The first wrist element 15 incorporates: the J5 axis motor (motor) 51; a first pulley (pulley) 52; a resin-made J5 axis belt (belt) 53; a second pulley (pulley) 54; a J5 axis input shaft 57; a J5 axis reducer 55; and a J5 axis encoder 58. The J5 axis motor 51 rotationally drives the first wrist element 15 about the fifth axis J5. The first pulley 52 is fixed to a rotary shaft of the J5 axis motor 51. The J5 axis belt 53 is engaged with the first pulley 52 so as to transmit rotation. The rotation is transmitted to the second pulley 54 through the J5 axis belt 53. The J5 axis input shaft 57 is fixed to the second pulley 54. The J5 axis reducer 55 is coupled to the J5 axis input shaft 57. The J5 axis encoder 58 detects a rotation angle of the J5 axis motor 51. The first wrist element 15 incorporates: a J6 axis motor (motor) 61; a third pulley (pulley) 62; a resin-made J6 axis belt (belt) 63; a fourth pulley (pulley) 64; a J6 axis input shaft 67; and a J6 axis encoder 68. The J6 axis motor 61 rotationally drives the sixth axis J6. The third pulley 62 is fixed to a rotary shaft of the J6 axis motor 61. The J6 axis belt 63 is engaged with the third pulley 62 so as to transmit rotation. The rotation is transmitted to the fourth pulley 64 through the J6 axis belt 63. The J6 axis input shaft 67 is fixed to the fourth pulley 64. The J6 axis encoder 68 detects a rotation angle of the J6 axis motor 61. The housing 16*a* incorporates: a bevel gear (not shown in the drawing); and a J6 axis reducer (not shown in the drawing). The bevel gear is coupled to the J6 axis input shaft 67, and changes an axis of rotation from the axis J5 to the axis J6. Rotational drive of the J6 axis input shaft 67 is transmitted to the J6 axis reducer by way of the bevel gear.

The rotary shaft of the J5 axis motor 51 is formed into a tapered shape and has a key. The rotary shaft of the J5 axis motor 5 is fitted into a tapered through hole which passes through the center of the first pulley 52 and has a keyway, and a bolt is fastened to a distal end of the rotary shaft of the J5 axis motor 51. With such a configuration, the J5 axis motor 51 and the first pulley 52 are fixed with each other. The J6 axis motor 61 and the third pulley 62 are fixed with each other with substantially the same structure.

A plurality of screw holes are formed in the J5 axis input shaft 57 on the second pulley 54 side, and the screw holes are formed on a circle concentric with the center axis of rotation of the J5 axis input shaft 57. A plurality of bolts are fastened to the screw holes from the outside of the second pulley 54 thus fixing the J5 axis input shaft 57 and the second pulley 54 with each other. The J6 axis input shaft 67 and the fourth pulley 64 are fixed with each other with substantially the same structure.

With such a configuration, rotation of the J5 axis motor 51 is transmitted to the J5 axis reducer 55 through the first pulley 52, the J5 axis belt 53, the second pulley 54, and the J5 axis input shaft 57. With substantially the same structure, rotation of the J6 axis motor 61 is transmitted to the J6 axis reducer not shown in the drawing through the third pulley 62, the J6 axis belt 63, the fourth pulley 64, and the J6 axis input shaft 67.

As shown in FIG. 2, the J5 axis motor 51 and the J6 axis motor 61 are incorporated in the same housing, that is, in the first wrist element 15. Accordingly, in the same manner as the conventional technique, to inspect deterioration of the J5 axis belt 53 or the like by directly measuring a belt tension, it is necessary to remove the bolts fixing the covers 15*a*, 15*b* each time the inspection is performed.

The control device 2 performs feedback control, which causes the motors to perform rotational drive, using rotation angles of the motors which are detected from the encoders provided for the respective axes J1 to J6. The control device 2 is formed of a CPU, a ROM, a RAM, and a memory, which are not shown in the drawing.

Figure 3:
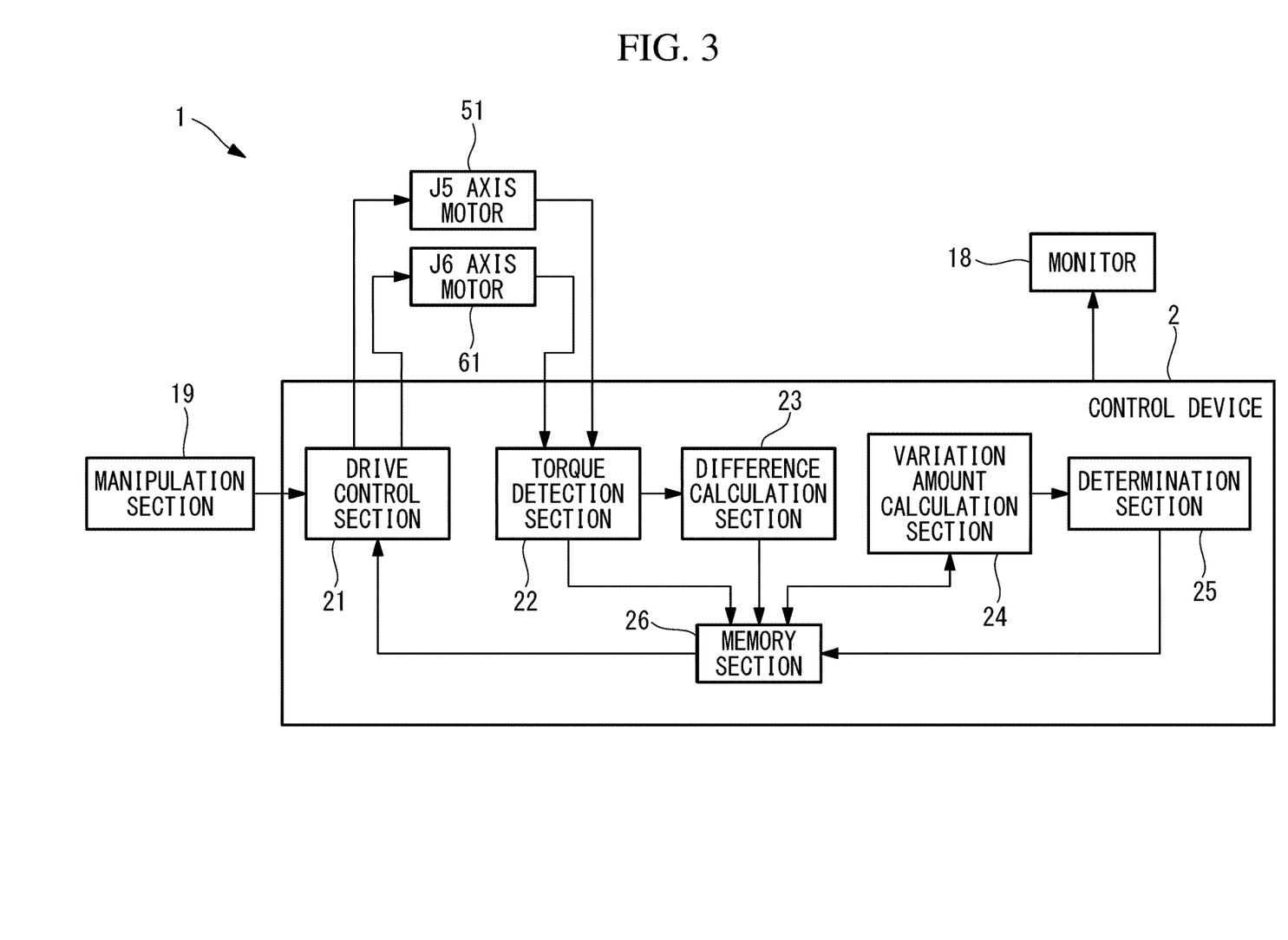
FIG. 3 is a block diagram of the robot which includes the control device.

FIG. 3 is a block diagram of the robot 1 which includes the control device 2. As shown in FIG. 3, the control device 2 includes: a drive control section 21; a torque detection section (detection section) 22; a difference calculation section (torque difference calculation section) 23; a variation amount calculation section (difference variation amount calculation section) 24; a determination section 25; and a memory section 26. The drive control section 21 controls the respective motors based on manipulation or the like which the manipulation section 19 receives. The torque detection section 22 detects a torque of the J5 axis motor 51 and a torque of the J6 axis motor 61. The difference calculation section 23 calculates a difference between a detected torque of the J5 axis motor 51 and a detected torque of the J6 axis motor 61. The variation amount calculation section 24 calculates a variation amount of a difference between detected torques calculated at two different points of time. The determination section 25 determines replacement of the J5 axis belt 53 and the J6 axis belt 63 by comparing the calculated variation amount and a threshold which is set in advance with each other. The memory section 26 stores an evaluation operation program and the like which are set in advance for driving the J5 axis motor 51 and the J6 axis motor 61 in detecting motor torques.

The drive control section 21 controls rotational drive of each motor which is necessary for the robot 1 to perform a task. Although the description will be made later in detail, the drive control section 21 is configured such that, upon reception of predetermined manipulation by the manipulation section 19, to perform a belt inspection which determines replacement timing for the J5 axis belt 53 and the J6 axis belt 63, the drive control section 21 rotationally drives the J5 axis motor 51 and the J6 axis motor 61 based on the evaluation operation program, which is stored in the memory section 26. When the J5 axis motor 51 and the J6 axis motor 61 drive based on the evaluation operation program, a torque of the J5 axis motor 51 and a torque of the J6 axis motor 61 vary with time.

The torque detection section 22 detects a motor torque of each motor by measuring a value of an electric current which flows through each motor. The torque detection section 22 measures values of electric currents which flow through the J5 axis motor 51 and the J6 axis motor 61 during a period when the evaluation operation program is performed, thus detecting motor torques which vary with time. The detected torque of the J5 axis motor 51 and the detected torque of the J6 axis motor 61 are stored in the memory section 26. The difference calculation section 23 calculates a difference in motor torque which is obtained by subtracting the detected torque of the J6 axis motor 61 from the detected torque of the J5 axis motor 51. The calculated difference in motor torque is stored in the memory section 26.

The variation amount calculation section 24 calculates a variation amount of a difference which is calculated when the evaluation operation program is performed at each of two different points of time, being a first point of time and a second point of time. For the variation amount of the difference, a value is obtained by subtracting a difference in motor torque calculated at the first point of time from a difference in motor torque calculated at the second point of time. The determination section 25 determines whether or not the calculated variation amount exceeds a positive threshold or a negative threshold which is set in advance.

The first point of time may be at the time of shipping a robot from a factory, for example. The evaluation operation program is performed at the time of shipping a robot from the factory so as to calculate motor torques of two motors. It is sufficient to store a variation with time in difference in motor torque between the two motors in the memory section 26.

The second point of time may be a desired point of time after the robot is used, such as after the robot is installed on site and is actually operated.

When a variation amount exceeds a positive threshold, the determination section 25 causes the monitor 18 to activate a display recommending replacement of the J5 axis belt 53. When a variation amount exceeds a negative threshold, the determination section 25 causes the monitor 18 to activate a display recommending replacement of the J6 axis belt 63.

Next, the description is made hereinafter with respect to one example of specific processing from performing the evaluation operation program to determining replacement of a belt, such as the J5 axis belt 53, based on a variation amount of difference in torque. In calculation process shown in FIG. 4 for calculating a variation with time in difference in motor torque, first (at the time of shipping the robot from the factory, for example), the drive control section 21 rotationally drives the J5 axis motor 51 and the J6 axis motor 61 based on the evaluation operation program (step S11). Next, the torque detection section 22 detects a torque of the J5 axis motor 51 and a torque of the J6 axis motor 61 which vary according to the evaluation operation program (step S12). The processing performed in step S11 and step S12 correspond to a first torque detection step in claim.

Figure 5:
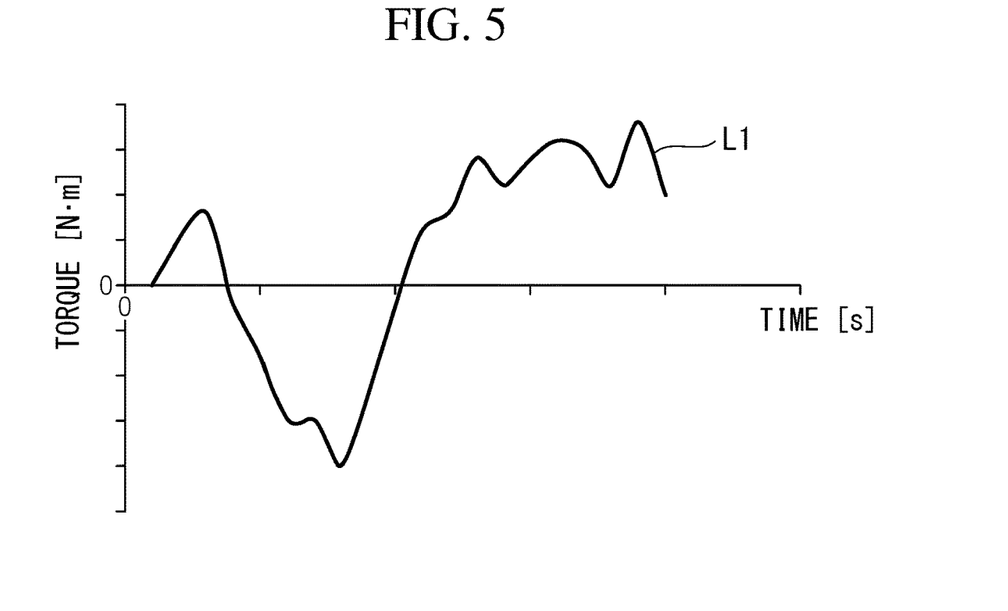
FIG. 5 is a graph of a variation with time in detected torque of a J5 axis motor.
Figure 6:
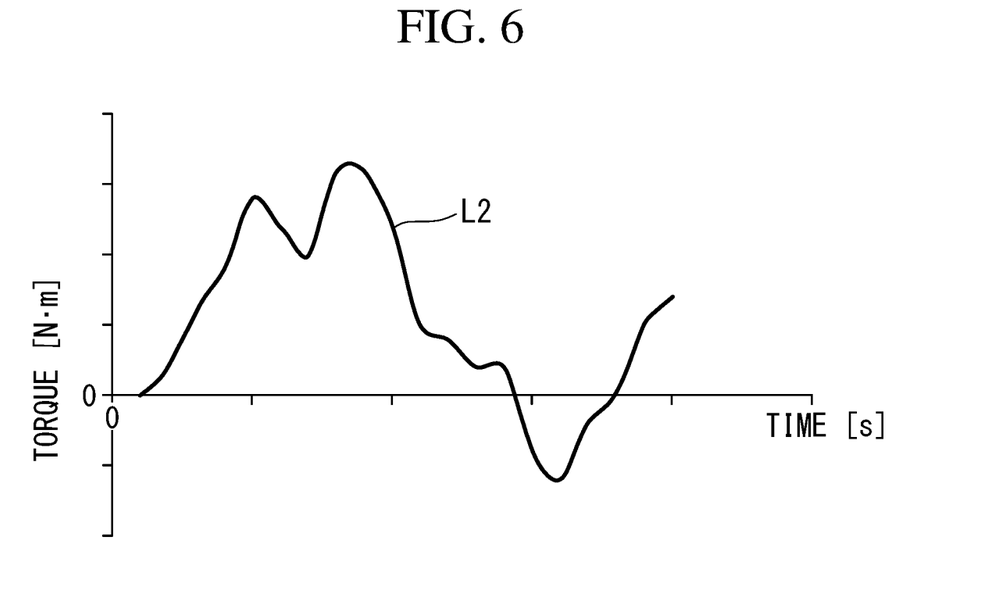
FIG. 6 is a graph of a variation with time in detected torque of a J6 axis motor.

A graph of a variation with time in detected torque of the J5 axis motor 51 is shown with a curve L1 in FIG. 5, and a graph of a variation with time in torque of the J6 axis motor 61 is shown with a curve L2 in FIG. 6. In FIG. 5 and in FIG. 6, time is shown on the horizontal axis, torque is shown on the vertical axis, and plus or minus of torque changes corresponding to the direction of the torque. The same definition of the vertical axis and the horizontal axis is also applicable to graphs shown in the following drawings. In this embodiment, an evaluation operation which is performed for rotationally driving the J5 axis motor 51 differs from an evaluation operation being performed for rotationally driving the J6 axis motor 61. Accordingly, the curve L1, indicating a variation with time in torque of the J5 axis motor 51, has completely different increase or decrease of torque from the curve L2, indicating a variation with time in torque of the J6 axis motor 61.

Figure 4:
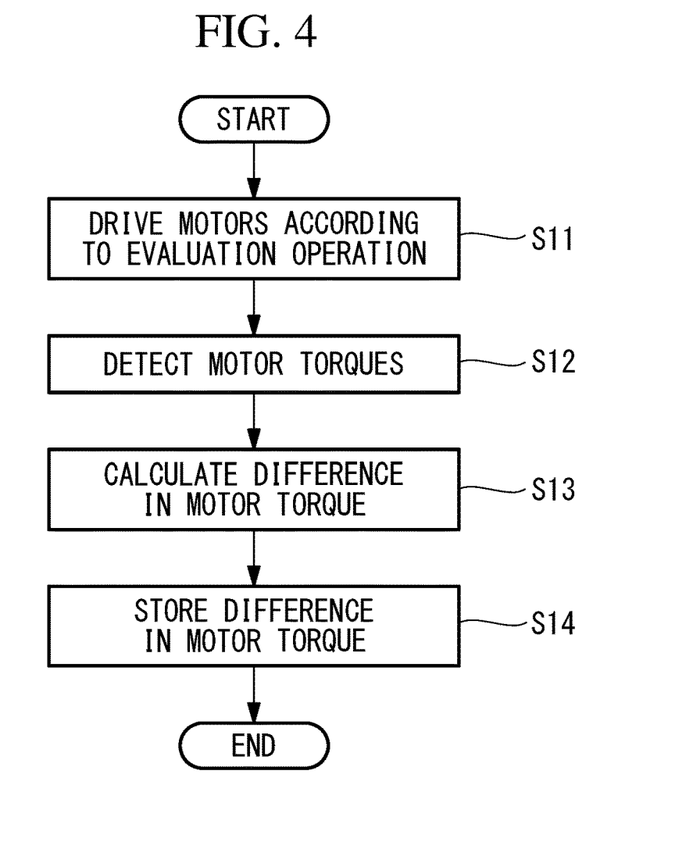
FIG. 4 is a flowchart of calculation process for calculating a difference in motor torque.

When a torque of the J5 axis motor 51 and a torque of the J6 axis motor 61 are detected, the difference calculation section 23 performs a first difference calculation step where a difference in motor torque is calculated, which is obtained by subtracting the torque of the J6 axis motor 61 from the torque of the J5 axis motor 51 (step S13). The difference calculation section 23 causes the memory section 26 to store the calculated variation with time in difference in motor torque at the first point of time (step S14). With such operations, the processing is finished.

Figure 7:
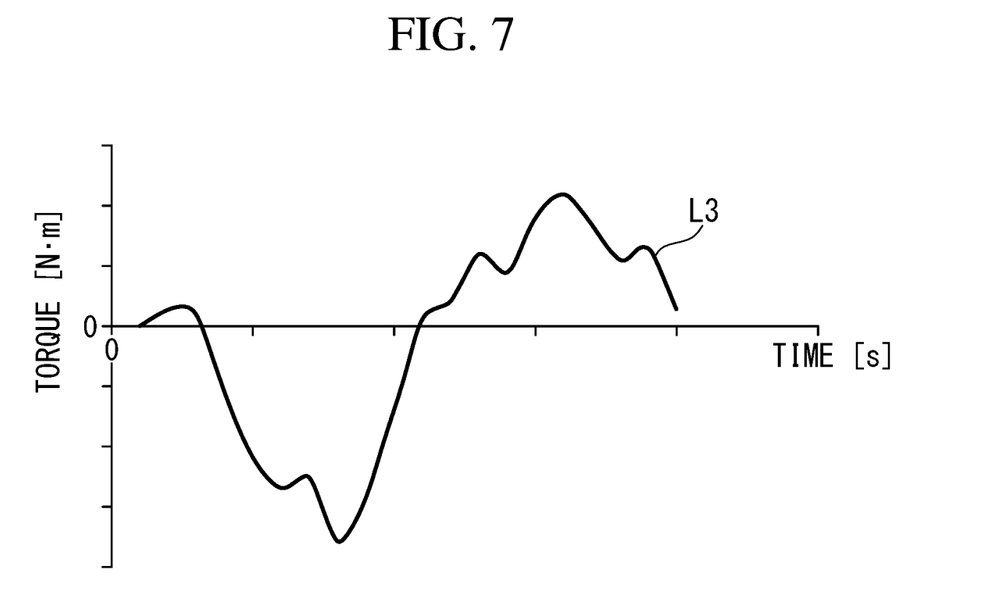
FIG. 7 is a graph showing a variation with time in difference between a torque of the J5 axis motor and a torque of the J6 axis motor.

FIG. 7 shows, with a curve L3, a graph of a variation with time in difference in motor torque, and the difference is obtained by subtracting the torque of the J6 axis motor 61 shown in FIG. 6 from the torque of the J5 axis motor 51 shown in FIG. 5. The curve L3 shows that when the torque assumes a positive value, a torque of the J5 axis motor 51 is larger than a torque of the J6 axis motor 61, and when the torque assumes a negative value, a torque of the J5 axis motor 51 is smaller than a torque of the J6 axis motor 61.

Figure 8:
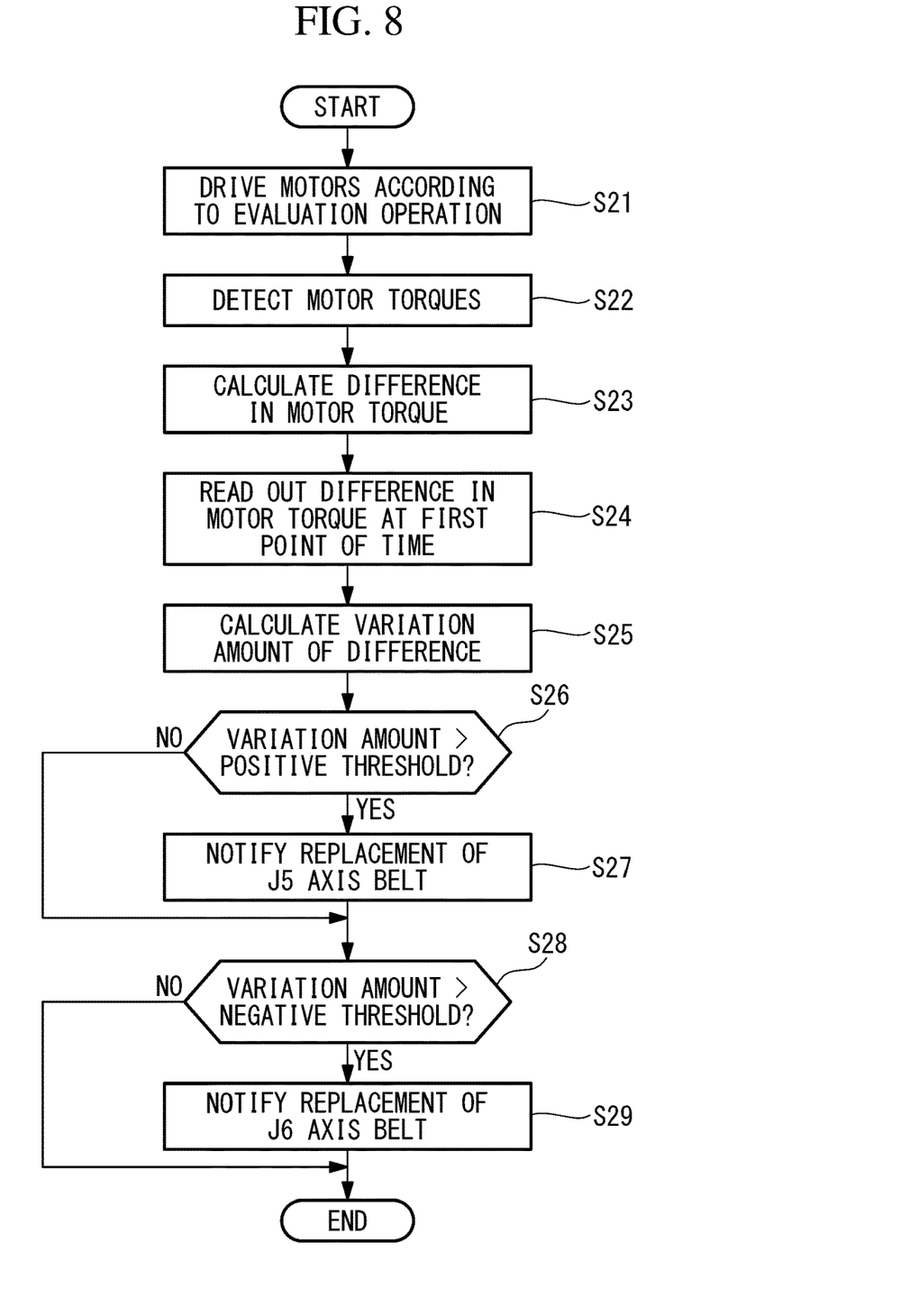
FIG. 8 is a flowchart of belt replacement determination process.

Next, at a predetermined time after the robot is installed on site and various operations are performed, calculation process shown in FIG. 4 for calculating a variation with time in difference in motor torque is performed again. Then, belt replacement determination process is performed, which uses the calculated variation with time in difference in motor torque. In the belt replacement determination process shown in FIG. 8, first, in the same manner as the processing performed in step S11 in FIG. 4, the drive control section 21 rotationally drives the J5 axis motor 51 and the J6 axis motor 61 again based on the evaluation operation program (step S21). Next, the torque detection section 22 detects a torque of the J5 axis motor 51 and a torque of the J6 axis motor 61 which vary according to the evaluation operation program (step S22). Processing performed in step S21 and step S22 correspond to a second torque detection step in claim.

Figure 9:
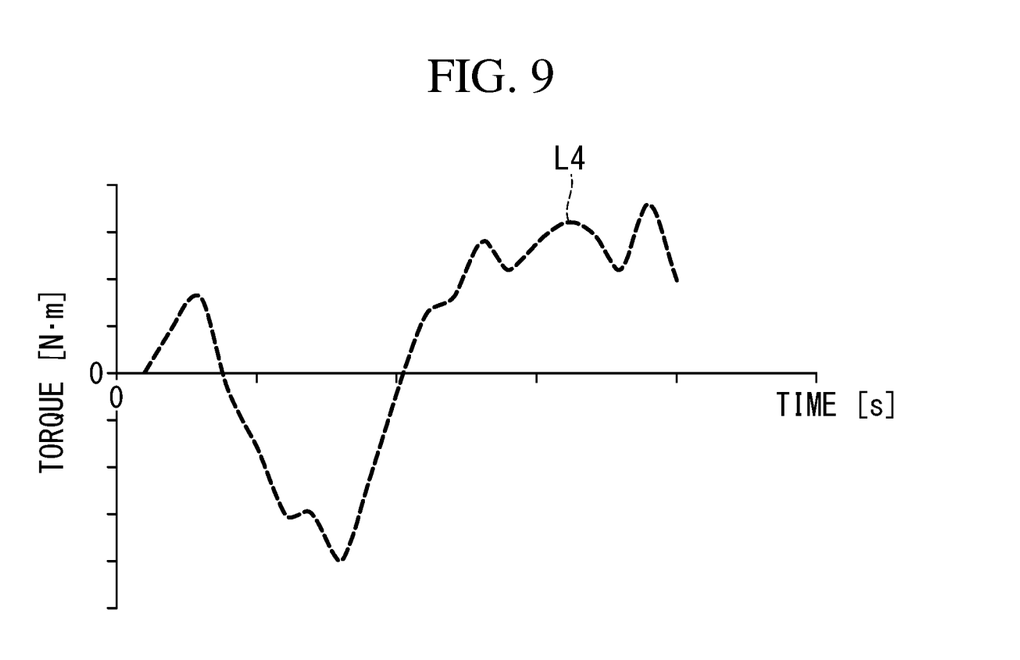
FIG. 9 is a graph of a variation with time in detected torque of the J5 axis motor.

A graph of a variation with time in torque of the J5 axis motor 51, which is detected in processing performed in step S22, is shown with a curve L4 indicated by a broken line in FIG. 9. A graph of a variation with time in torque of the J6 axis motor 61 is shown with a curve L5 indicated by a broken line in FIG. 10. In the same manner as FIG. 5 and FIG. 6, in FIG. 9 and in FIG. 10, torque is shown on the vertical axis, and plus or minus of torque changes corresponding to the direction along which the torque is applied. The same evaluation operation program is performed and hence, the curve L1 in FIG. 5 and the curve L4 in FIG. 9 have similar variation with time in torque. In the same manner, the curve L2 in FIG. 6 and the curve L5 in FIG. 10 have similar variation with time in torque.

Figure 10:
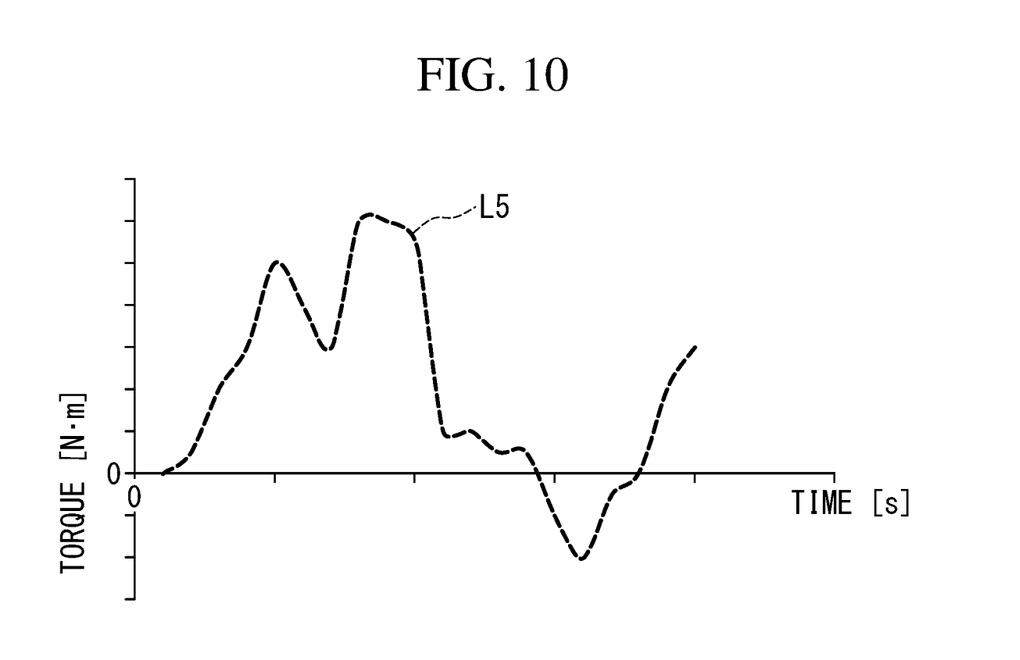
FIG. 10 is a graph of a variation with time in detected torque of the J6 axis motor.

When the robot 1 is operated for a fixed period of time, the J5 axis belt 53 and the J6 axis belt 63 deflect due to deterioration so that belt tension of the J5 axis belt 53 and belt tension of the J6 axis belt 63 are reduced. Reduction in belt tension causes reduction in motor torque of a motor which rotates the belt through the pulley. That is, operating the robot 1 gradually reduces a motor torque of a motor which transmits a driving force using the belt. Accordingly, an absolute value of the torque of the J5 axis motor 51 shown in FIG. 9 is smaller than an absolute value of the torque of the J5 axis motor 51 shown in FIG. 5, and an absolute value of the torque of the J6 axis motor 61 shown in FIG. 10 is smaller than an absolute value of the torque of the J6 axis motor 61 shown in FIG. 6.

Figure 11:
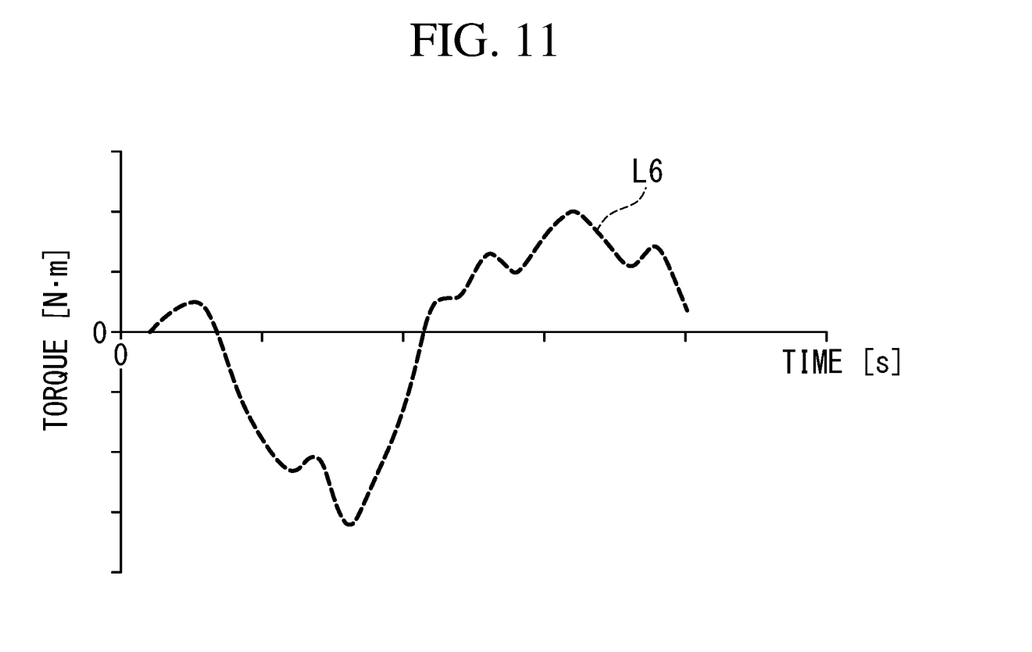
FIG. 11 is a graph showing a variation with time in difference between the detected torque of the J5 axis motor and the detected torque of the J6 axis motor.

Upon detection of a motor torque, the difference calculation section 23 performs a second difference calculation step where a variation with time in difference in motor torque is calculated, which is obtained by subtracting the torque of the J6 axis motor 61 from the torque of the J5 axis motor 51 (step S23). FIG. 11 shows, with a curve L6 indicated by a broken line, a graph of a variation with time in difference in motor torque, and the difference is obtained by subtracting the torque of the J6 axis motor 61 shown in FIG. 10 from a torque of the J5 axis motor 51 shown in FIG. 9.

Figure 12:
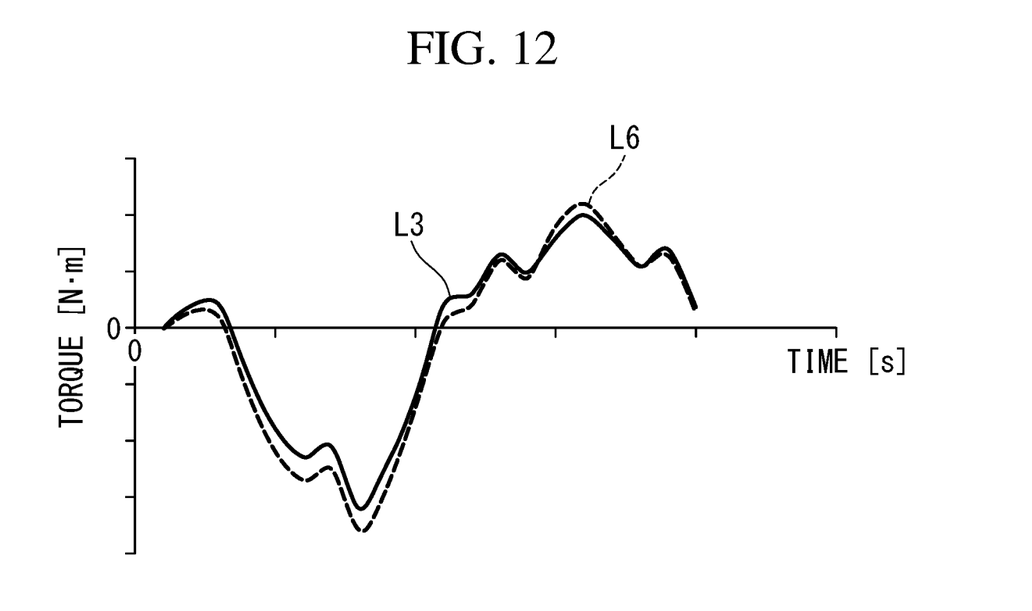
FIG. 12 is a graph showing a variation with time in difference between two motor torques calculated at two points of time.

Next, a variation with time in difference in motor torque at the first point of time is read out, and the variation is stored in the memory section 26 (step S24). The variation amount calculation section 24 performs difference variation amount calculation step (step S25). In such a step, the variation amount calculation section 24 calculates a variation with time in variation amount of a difference in motor torque, and the difference is obtained by subtracting a variation with time in difference in motor torque (the curve L3 in FIG. 7), which is read from the memory section 26, and is calculated in the processing performed in step S13, from a variation with time in difference in motor torque (the curve L6 in FIG. 11), which is calculated in the processing performed in step S23. FIG. 12 shows variations with time in difference in motor torque, which are calculated in the processing performed in step S13 and step S23. As shown in FIG. 12, the variation with time in difference in motor torque, which is calculated in the processing performed in step S13 (the curve L3) and the variation with time in difference in motor torque, which is calculated in the processing performed in step S17 (the curve L6) have similar increase or decrease of torque, but have different torque values.

Figure 13:
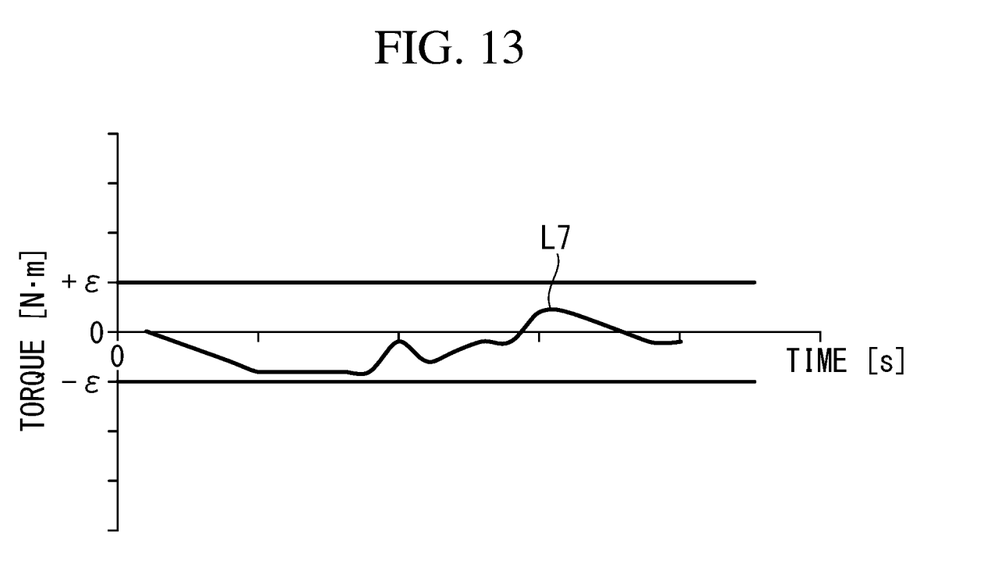
FIG. 13 is a graph showing a variation with time in variation amount of a difference between the two motor torques calculated at two points of time.

Upon calculation of a variation amount of a difference in motor torque, the determination section 25 determines whether or not the calculated variation amount has a value larger than a positive threshold (step S26). FIG. 13 shows a curve L7, and a positive threshold +ε and a negative threshold −ε which are stored in the memory section 26. The curve L7 shows a variation with time in variation amount of a difference in motor torque, and the difference is obtained by subtracting a variation with time in difference in motor torque (the curve L3), which is calculated in the processing performed in step S13, from a variation with time in difference in motor torque (the curve L6), which is calculated in the processing performed in step S23. The curve L7 in FIG. 13 does not have a value higher than the positive threshold +ε (step S26: NO). Accordingly, processing in step S28 described later is performed next. In the processing performed in step S26, when a variation amount of a difference in motor torque has a value higher than the positive threshold +ε (step S26: YES), the determination section 25 causes the monitor 18 to activate a display notifying replacement of the J5 axis belt 53 (step S27).

At this point of operation, a state where a variation amount of a difference in motor torque has a plus sign indicates that a difference in motor torque at a second point of time, which is calculated in processing performed in step S23, is smaller than a difference in motor torque at a first point of time, which is calculated in processing performed in step S13. The difference in motor torque is a value obtained by subtracting a torque of the J6 axis motor 61 from a torque of the J5 axis motor 51. Accordingly, a small difference in motor torque at the second point of time indicates that the torque of the J5 axis motor 51 is reduced more than the torque of the J6 axis motor 61 due to a use state of the robot 1. Accordingly, a state where a variation amount of a difference in motor torque has a plus sign indicates that a torque of the J5 axis motor 51 is reduced more than a torque of the J6 axis motor 61. A case where a variation amount of a difference in motor torque exceeds the positive threshold +ε which is set in advance indicates that a torque of the J5 axis motor 51 is smaller than a torque of the J6 axis motor 61 by an amount corresponding to a numerical value ε. In this embodiment, such a case is determined to be timing at which the J5 axis belt 53 is advised to be replaced. A state where a variation amount of a difference in motor torque has a minus sign indicates that the corresponding states apply for the J6 axis motor 61 and the J6 axis belt 63.

When processing in step S27 is performed, the determination section 25 performs determination step where determination is performed whether or not the calculated variation amount has a value smaller than the negative threshold (step S28). In the case of FIG. 13, the curve L7 does not have a value smaller than the negative threshold −ε (step S28: NO) and hence, the belt replacement determination process is finished. In the processing performed in step S28, when a variation amount of a difference in motor torque has a value smaller than the negative threshold −ε (step S28: YES), the determination section 25 causes the monitor 18 to activate a display notifying replacement of the J6 axis belt 63 (step S29). With such operations, the belt replacement determination process is finished. Processing performed in step S26 and step S28 correspond to a determination step in claim.

According to the robot 1 of this embodiment having such a configuration, at each of the first point of time and the second point of time, two torques are detected, that is, torques of the J5 axis motor 51 and the J6 axis motor 61 which are driven by the evaluation operation program, and a difference in detected motor torque is calculated. A case where two motor torques are calculated at two points of time, and a variation amount of a difference between these two motor torques exceeds a threshold, which is set in advance, is determined to be replacement timing for the J5 axis belt 53 or the J6 axis belt 63.

With such a configuration, in performing replacement determination with respect to the J5 axis belt 53 or the J6 axis belt 63, replacement timing for the J5 axis belt 53 and the J6 axis belt 63 can be acquired without removing the covers 15a, 15b in order to measure belt tension each time the measurement is performed. Reduction in belt tension causes a torque of the J5 axis motor 51 and a torque of the J6 axis motor 61 to reduce. These motor torques are also affected by conditions besides belt tension, such as a motor temperature, an outside air temperature and the like. In view of the above, in this embodiment, a variation amount of a difference in torque between two motors, that is, the J5 axis motor 51 and the J6 axis motor 61, is used as a reference for determining belt replacement timing. Accordingly, it is possible to reduce the effect on variation in motor torque from a temperature or an outside air temperature and hence, lifespan of the J5 axis belt 53 and the J6 axis belt 63 can be predicted with high accuracy.

In this embodiment, the J5 axis motor 51 and the J6 axis motor 61, of which torques are used for calculating the difference, are disposed in the same housing, that is, in the first wrist element 15. Accordingly, it is possible to reduce the effect on variation in motor torque from a temperature or an outside air temperature. In this embodiment, a first point of time, forming one of points at which a motor torque is detected by the evaluation operation program, is set at the time of shipping the robot 1 from the factory. Further, a second point of time, which comes after the first point of time, is set to a desired point of time after the robot 1 is used, such as after the robot 1 is installed on site and is actually operated. Therefore, lifespan of a belt can be regularly inspected using a time when the robot is shipped from the factory as a reference. The evaluation operation program at the second point of time may be performed when the manipulation section 19 receives predetermined manipulation, or may be automatically performed at regular intervals.

In the above-mentioned embodiment, the description has been made by taking one mode of the control device as an example of the belt replacement determination device of the robot 1. However, the configuration of the robot 1 and processing performed by the control device 2 can be modified variously. For example, the robot 1 is not necessarily formed of a vertical articulated robot. It is sufficient that the robot 1 includes two or more motors, and at least one motor transmits a driving force using a belt. In the above-mentioned embodiment, the J5 axis motor 51 and the J6 axis motor 61 transmit a driving force using the belts. However, one of the J5 axis motor 51 and the J6 axis motor 61 may transmit a driving force using an element other than the belt (using a shaft, for example). The two motors, of which a difference in torque is calculated, are not always necessary to be accommodated in the same housing. For example, torques of two motors consisting of the J6 axis motor 61 and a J1 axis motor may be detected. In the above-mentioned embodiment, belt replacement determination process is performed based on a variation amount of a difference between two motor torques. However, a variation amount of a difference between three or more motor torques may be used.

In the above-mentioned embodiment, for thresholds of a variation amount of a difference in motor torque, the numerical values ε having the same absolute value are set as the positive threshold and the negative threshold. However, setting of thresholds can be modified variously. For example, depending on the material for forming the belt, a time at which a belt is desired to be replaced or the like, different numerical values may be set to an absolute value of a positive threshold and an absolute value of a negative threshold. Without setting different numerical values for positive and negative thresholds, replacement timing for either of the belts, being the subject of determination, may be determined based on determination of whether or not an absolute value of a variation amount of a difference in motor torque exceeds a predetermined threshold.

In the belt replacement determination process of the above-mentioned embodiment, a difference in motor torque is calculated upon detection of a torque of the J5 axis motor 51 and a torque of the J6 axis motor 61. However, the order of these processing can be modified variously. For example, processing may be performed such that, after a detection of a torque of the J5 axis motor 51 and a torque of the J6 axis motor 61 at a first point of time, the torques are stored in the memory section 26 and, after a detection of a torque of the J5 axis motor 51 and a torque of the J6 axis motor 61 at a second point of time, differences in motor torque at two points of time are calculated.

From the above-described embodiment, the following invention is derived.

One aspect of the present invention provides a belt replacement determination device which includes: a drive control section configured to drive, based on an evaluation operation set in advance, two or more motors out of a plurality of motors which drive joint shafts of a robot, the two or more motors including the motor which drives at least one of the joint shafts through pulleys and belts; a detection section configured to detect motor torques of the two or more motors which vary according to the evaluation operation; a torque difference calculation section configured to calculate a difference between the motor torques detected of the two or more motors; a difference variation amount calculation section configured to calculate a variation amount between two differences detected at two points of time; and a determination section configured to determine replacement of the belt upon an absolute value of the variation amount calculated exceeding a predetermined threshold.

According to this aspect, two or more motors are driven based on the evaluation operation which is set in advance, and variations in motor torques of the motors during driving are detected. A difference in variation between two or more motor torques is calculated, and a variation amount of these two differences at two different points of time is calculated. A case where an absolute value of the calculated variation amount exceeds a predetermined threshold which is set in advance is determined to be replacement timing for the belt used for the motor of which a motor torque is detected.

That is, according to this aspect, belt replacement timing is determined based on motor torques of the motors without measuring tension applied to the belt. The tension applied to the belt varies also according to lifespan of the belt and conditions (temperature, for example) under which a robot having the belt is used. The determination is made using the difference in motor torque between two or more motors which are used in the same conditions and hence, it is possible to eliminate the effect on lifespan of the belt from conditions under which the robot is used. When a variation amount between differences in motor torque at two points of time is large, it can be seen that a motor torque of at least one of the two or more motors is reduced. Reduced belt tension reduces a motor torque. Accordingly, when an absolute value of the variation amount between these differences becomes large and exceeds a threshold, there is a possibility of the reduction of lifespan of the belt which transmits a driving force of the motor.

As described above, by comparing the variation amount between differences in motor torque and the threshold with each other, lifespan of the belt can be determined without deliberately measuring tension of the belt. Accordingly, it is possible to improve usability of the task of determining belt replacement timing.

In the above-mentioned aspect, the difference in motor torque between two motors which drive the joint shafts through the pulleys and the belts may be used as the difference in motor torque between the two or more motors.

With the use of a difference in motor torque between two motors each of which uses the belt, it is possible to further reduce the effect on tension of the belt, that is, on a motor torque, from conditions under which the robot is used. Accordingly, lifespan of the belt can be determined with higher accuracy.

In the above-mentioned aspect, the determination section may determine, based on a sign of the variation amount, replacement of one of the belts out of two of the belts which are used in the two motors.

When lifespan of one belt is shorter than lifespan of the other belt, the motor having the belt with shorter lifespan has a greater reduction amount of motor torque. Accordingly, determining the sign of a variation amount of a difference allows the belt with shorter lifespan to be identified.

In the above-mentioned aspect, the robot may be formed of a vertical articulated robot, and the two or more motors may be disposed at positions closer to a distal end than another motor, and be accommodated in a same housing.

With such a configuration, motor torques of the motors accommodated in the same housing are determined and hence, it is possible to reduce errors in belt replacement timing which is decided based on conditions under which the robot is used. Belt replacement timing is determined based on motor torques and hence, it is unnecessary to remove the cover of the housing each time the measurement is performed whereby usability of the task is improved.

In the above-mentioned aspect, one of the two points of time may be a time of starting use of the robot, and another of the two points of time may be a time of inspecting the belt used for the joint shaft of the robot.

With such a configuration, a variation amount of a difference after the robot is used is determined using the difference at the time of starting use of the robot as a reference so that maintenance of the belt can be performed regularly.

Another aspect of the present invention provides a belt replacement determination method which includes: a first torque detection step of detecting, at a first point of time, motor torques of two or more motors out of a plurality of motors which drive joint shafts of a robot, which vary according to an evaluation operation set in advance, by driving, based on the evaluation operation, the two or more motors, the two or more motors including the motor which drives at least one of the joint shafts through pulleys and belts; a first difference calculation step of calculating a difference between the motor torques of the two or more motors, the motor torques being detected in the first torque detection step; a second torque detection step of detecting, at a second point of time, motor torques of the two or more motors by driving the two or more motors based on the evaluation operation; a second difference calculation step of calculating a difference between the motor torques of the two or more motors, the motor torques being detected in the second torque detection step; a difference variation amount calculation step of calculating a variation amount from the difference calculated in the first difference calculation step to the difference calculated in the second difference calculation step; and a determination step of determining replacement of the belt upon an absolute value of the variation amount calculated exceeding a predetermined threshold.

According to this aspect, the difference calculated in the first difference calculation step, and the difference calculated in the second difference calculation step are calculated. A case where a variation amount between these differences exceeds a threshold is determined to be replacement timing for the belt used in the motor. Accordingly, it is unnecessary to deliberately measure tension of the belt in order to acquire belt replacement timing. Belt replacement timing is determined based on the difference between two or more motor torques and hence, it is possible to reduce an effect on belt replacement timing from conditions under which the robot is used. Accordingly, usability of determining belt replacement timing is improved, and it is possible to acquire appropriate replacement timing for the belt.

REFERENCE SIGNS LIST

1 robot
2 control device (replacement determination device)
21 drive control section
22 torque detection section (detection section)
23 difference calculation section (torque difference calculation section)
24 variation amount calculation section (difference variation amount calculation section)
25 determination section
51 J5 axis motor (motor)
61 J6 axis motor (motor)
53 J5 axis belt (belt)
63 J6 axis belt (belt)
52 first pulley (pulley)
54 second pulley (pulley)
62 third pulley (pulley)
64 fourth pulley (pulley)
+ε positive threshold (predetermined threshold)
−ε negative threshold (predetermined threshold)
J1 to J6 joint axis
step S11, step S12 first torque detection step
step S13 first difference calculation step
step S21, step S22 second torque detection step
step S23 second difference calculation step
step S25 difference variation amount calculation step
step S26, step S28 determination step

The invention claimed is:

1. A belt replacement determination device comprising:
a drive control section configured to drive, based on an evaluation operation set in advance, two or more motors out of a plurality of motors which drive joint shafts of a robot, the two or more motors including a motor which drives at least one of the joint shafts through pulleys and a belt;
a detection section configured to detect motor torques of the two or more motors which vary according to the evaluation operation;
a torque difference calculation section configured to calculate a difference between the detected motor torques of the two or more motors;
a difference variation amount calculation section configured to calculate a variation amount between two differences detected at two points of time; and
a determination section configured to determine replacement of the belt upon an absolute value of the variation amount calculated exceeding a predetermined threshold.

2. The belt replacement determination device according to claim 1, wherein the difference in motor torque between two motors which drive the joint shafts through the pulleys and the belt is used as the difference in motor torque between the two or more motors.

3. The belt replacement determination device according to claim 2, wherein the determination section determines, based on a sign of the variation amount, replacement of one of the belts out of two of the belts which are used in the two motors.

4. The belt replacement determination device according to claim 1, wherein the robot is formed of a vertical articulated robot, and
the two or more motors are disposed at positions closer to a distal end than another motor, and are accommodated in a same housing.

5. The belt replacement determination device according to claim 1, wherein one of the two points of time is a time of starting use of the robot, and another of the two points of time is a time of inspecting the belt used for the joint shaft of the robot.

6. A belt replacement determination method comprising:
a first torque detection step of detecting, at a first point of time, motor torques of two or more motors out of a plurality of motors which drive joint shafts of a robot, which vary according to an evaluation operation set in advance, by driving, based on the evaluation operation, the two or more motors, the two or more motors including a motor which drives at least one of the joint shafts through pulleys and a belt;
a first difference calculation step of calculating a difference between the motor torques of the two or more motors, the motor torques being detected in the first torque detection step;

a second torque detection step of detecting, at a second point of time, motor torques of the two or more motors by driving the two or more motors based on the evaluation operation;

a second difference calculation step of calculating a difference between the motor torques of the two or more motors, the motor torques being detected in the second torque detection step;

a difference variation amount calculation step of calculating a variation amount from the difference calculated in the first difference calculation step to the difference calculated in the second difference calculation step; and a determination step of determining replacement of the belt upon an absolute value of the variation amount calculated exceeding a predetermined threshold.

* * * * *